United States Patent [19]
Royer et al.

[11] Patent Number: 5,850,353
[45] Date of Patent: Dec. 15, 1998

[54] DYNAMIC MULTIPLE COMPARISON DIGITAL DEVICE PARTICULARLY FOR THE REAL TIME MONITORING OF A PLURALITY OF SIGNALS

[75] Inventors: Christian Royer, Le Bono; Philippe Royer, Arradon; Bernard Magnen, Vannes, all of France

[73] Assignee: Innova Son, S.a.r.l., Ploeren, France

[21] Appl. No.: 632,451

[22] PCT Filed: Oct. 17, 1994

[86] PCT No.: PCT/FR94/01200

§ 371 Date: Jun. 7, 1996

§ 102(e) Date: Jun. 7, 1996

[87] PCT Pub. No.: WO95/11497

PCT Pub. Date: Apr. 27, 1995

[30] Foreign Application Priority Data

Oct. 18, 1993 [FR] France .................................. 93 12365

[51] Int. Cl.$^6$ .................................. G06F 7/04; G06F 7/02
[52] U.S. Cl. .................. 364/550; 364/551.01; 371/67.1; 395/184.01
[58] Field of Search .................. 340/146.2, 511, 340/525; 364/550, 551.01; 371/31, 67.1, 69.1; 395/184.01, 185.01, 185.02, 185.03, 185.04

[56] References Cited

U.S. PATENT DOCUMENTS

| 2,922,990 | 1/1960 | Anderson | 395/184.01 |
| 3,344,408 | 9/1967 | Singer et al. | 395/184.01 |
| 4,400,811 | 8/1983 | Brown et al. | 371/69.1 |
| 4,668,939 | 5/1987 | Kimura et al. | 340/511 X |

FOREIGN PATENT DOCUMENTS

| 0 245 178 | 11/1987 | European Pat. Off. . |
| 0 248 732 | 12/1987 | European Pat. Off. . |
| 60-208145 | 10/1985 | Japan . |

Primary Examiner—Edward R. Cosimano
Attorney, Agent, or Firm—Young and Thompson

[57] ABSTRACT

A dynamic multiple comparison device for real time monitoring of changes in incoming digital words streams. The device includes a memory (12) having N memory cells, a comparison section (13, 11, BD1, BD3, BA1) for making a series of N comparisons, a selection section (RC) for selecting after each N comparison, a digital word, a first writing section (14, BD2, W) for writing the selected N digital words, a reading section (11, BA1, BA2, CL, R) for reading the stored digital words, and a control section (17, LC) for controlling the cyclic operation of the device. The device has applications in nuclear power plant control and monitoring.

13 Claims, 3 Drawing Sheets

DYNAMIC MULTIPLE COMPARISON DIGITAL DEVICE PARTICULARLY FOR THE REAL TIME MONITORING OF A PLURALITY OF SIGNALS

FIELD OF THE INVENTION

The present invention relates generally to signal processing. More particularly, the invention relates to the monitoring in real time of changes of a plurality of available signals in the form of an uninterrupted flow of digital words.

BACKGROUND OF THE INVENTION

The development of techniques gives rise to ever increasing complexity of the systems. In a complex system such as a control and monitoring system in a nuclear power plant, the number of signals apt to malfunction or requiring adjustments in real time is always very great. Security requirements often impose real time constraints on signal processing, and there exists a real need for monitoring devices capable of following the changes in a plurality of signals. With such monitoring devices, it becomes possible to detect certain particular events in the signals so as very rapidly to take suitable measures or to actuate alarms. In another field, that of high fidelity audit signal transmission systems such as those produced and processed in recording studios, radio and television stages and control rooms, or concert halls, it is important to be able to monitor signals in real time, essentially to avoid distortions due to saturation and to adjust gain optimally.

SUMMARY OF THE INVENTION

The present invention therefore has for its object to provide dynamic multiple comparison devices permitting monitoring simultaneously a large number of signals supplied in the form of digital words, and this in real time.

Another object of the invention is to provide dynamic multiple comparison devices which, by their design, will be available in the form of integrated circuits, so as to be easily integrated into systems and this at low cost and with maximum guarantee of reliability.

To this end, the invention relates to a dynamic multiple comparison device to monitor in real time changes in a stream of incoming digital words, characterized in that it comprises memory means having N memory cells to memorize respectively N previously selected digital words from the stream of incoming digital words, N being a predetermined whole number, comparison means to effect a series of N comparisons respectively between N incoming digital words and the N memorized digital words, upon each comparison an incoming digital word being compared with a memorized digital word of the same rank, selection means to select after each of the N comparisons a digital word from among the two compared digital words and this as a function of a predetermined comparison condition and to obtain thereby N selected digital words, first writing means to write the N selected digital words respectively in the N memory cells of the memory means, reading means to read the memorized digital words in the memory means, and control means to control a cyclic operation of the device and thereby to process all of the stream of incoming digital words by means of a plurality of successive series of N comparisons each.

According to another characteristic, the device according to the invention also comprises second writing means to write episodically or cyclically initialization digital words in the memory cells of the memory means.

Still another object of the invention is to provide dynamic multiple comparison devices easily integrable into professional systems for processing high fidelity audio signals.

To this end, a dynamic multiple comparison device included in a professional switching and bidirectional transmission system with time multiplexing of high fidelity audio-digital signals and audio-analog signals is characterized in that it comprises means to permit a display of the memorized digital words on a screen of a microprocessor included also in the system and this in a plurality of control blocks provided on said screen so as to permit the user to monitor in real time the change of various parameters of a plurality of signals transmitted in the system and to control in real time modifications and adaptations of configuration of the system. Preferably, the device also comprises address means included in the reading means so as to control the reading in the comparison means of any series of memorized digital words.

BRIEF DESCRIPTION OF THE DRAWINGS

Other characteristics and advantages of the invention will become apparent from a reading of the following description of several preferred examples of embodiment of dynamic multiple comparison devices according to the invention, in which.

DESCRIPTION OF THE PREFERRED EMBODIMENTS

Figure 1:
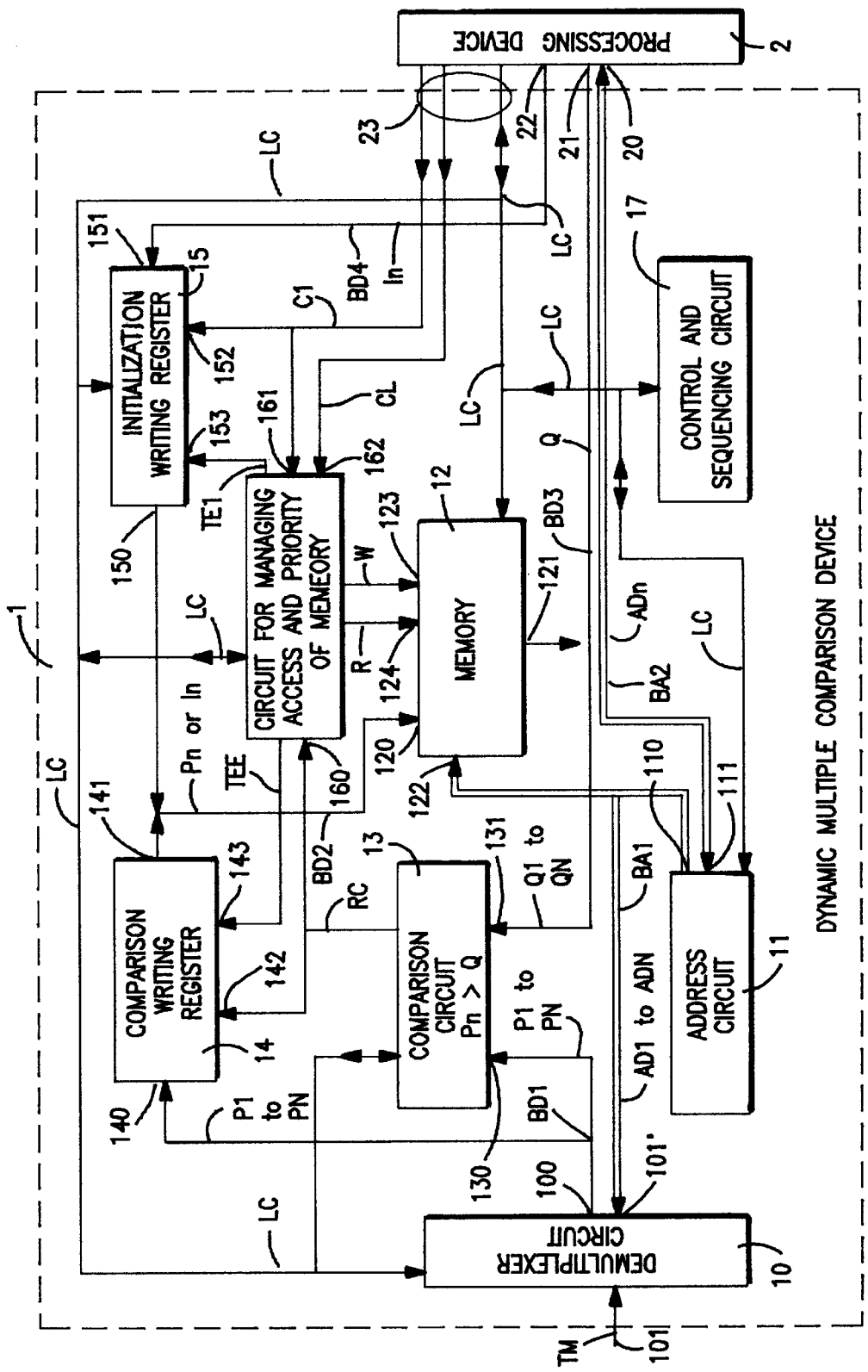
FIG. 1 is a block diagram of a preferred embodiment of a device according to the invention.

Referring to FIG. 1, a dynamic multiple comparison device or dynamic multiple comparator according to the invention comprises essentially a demultiplexing circuit 10, an address circuit 11, a memory 12, a comparison circuit 13, a comparison writing register 14, an initialization writing register 15, a circuit for managing access and priority of memory 16 and a control and sequencing circuit 17.

The demultiplexing circuit is connected at its input to a transmission line 101 that conveys successive multiplex frames TM each comprised of N digital words of input data P1 to PN in the form of a series of bits, N being a whole number. The transmission line 101 is for example constituted by a coaxial cable or of a conventional twisted pair. The words P1 to PN represent for example analog audio signals p1 to pN, respectively. The signals p1 to pN are sampled at a sampling frequency Fe (sampling period Te=1/Fe) and are then digitized. The demultiplexing circuit 10 has for its principal function demultiplexing the frames TM and thus rendering accessible the words P1 to PN in the form of words constituted of L bits in parallel, L being a whole number. The words P1 to PN are delivered at the outlet to a data bus BD1 via a data outlet port 100. The data bus BD1 is connected to a first data input 130 of the comparison circuit 13 and to a data input port 140 of the comparison writing recorder 14. The demultiplexing circuit 10 transmits successively the words P1 to PN over the data bus BD1 upon receipt of digital address words AD1 to ADN, respectively.

The address words AD1 to ADN are produced by the address circuit 11 and are supplied to the demultiplexing circuit 10 via an address output port 110 connected to an address bus BA1. The address words AD1 to ADN are in the form of several bits in parallel. The bus BA1 is connected to an address input port 101' of the demultiplexing circuit 10 and to an address input 122 of the memory 12.

The address circuit 11 is of conventional type and is designed essentially about a binary counter. According to a first mode of operation, the address circuit 11 produces sequentially the address words ADn, n being a whole number comprised between 1 and N and representing a rank in the frame TM, and then delivers them via the bus BA1.

According to a second manner of operation, the address circuit 11 receives, at an address input port 111, the address words ADn via an address bus BA2 connected to an address output port 20 of the processing device 2, and transmits in a "transparent" manner the received address words ADn in the direction of the address bus BA1. The address words ADn can be transmitted on the bus BA2 in any order, sequentially or not, for example, according to the following order "AD3, AD1, AD16, AD3, ADN . . . ADN . . . AD9". The interest in this second manner of operation will be further explained in the description.

The memory 12 is provided to contain N digital data words Q1 to QN each having L bits. The memory 12 comprises as inputs/outputs essentially a data writing port 120, a data reading port 121, the address port 122 and control inputs for writing 123 and for reading 124.

The data writing port 120 is connected via a data bus BD2 to data output ports 141 and 150 of the comparison writing register 14 and of the initialization writing register 15, respectively, and receives either input data words Pn or initialization data digital words In to be written in the memory 12. The data reading port 121 is connected via a data bus BD3 to a second data input port 131 of the comparison circuit 13 and to a data input port 21 of the processing device 2. The data reading port 121 delivers the data digital words Qn memorized when the memory 12 is controlled to read. The address port 122 receives address words Adn so as to select in the memory 12 the corresponding memory cells. The memory 12 comprises N cells containing N memorized digital words Q1 to QN selected by the address words AD1 to ADN, respectively. The writing control input 123 receives a writing control signal W supplied by the circuit for managing access and priority of memory 16. The reading control input 124 receives a reading control signal R supplied by the circuit for managing access and priority of memory 16. The signals W and R control in the memory 12 respectively the writing of a data word Pn or In present in the data bus BD2 and the reading of a data word Qn memorized in the memory 12, and this within the memory cell corresponding to the address word ADn applied at that moment to the address input port 122 of the memory 12.

The comparison circuit 13 has for its function to compare the input data words Pn and the memorized data words Qn. The comparison circuit 13 emits a signal RC showing the result of the comparison, at a logic state "1" when a predetermined comparison condition takes place between the words Pn and Qn. In the case of this embodiment, said comparison condition corresponds to the logic function "greater than" (>) . Thus, according to this comparison condition, when the absolute value of the word Pn is greater than the absolute value of the word Qn, the condition is satisfied that the signal RC reaches the logic state "1"; when the absolute value of the word Pn is equal to or less than the absolute value of the word Qn, this condition is not realized and the signal RC remains in the logic state "0". The comparison result signal RC is supplied to a reading control input 142 of the comparison writing register 14 and to a writing control input 160 of the circuit for management of access and priority of memory 16.

The comparison writing register 14 is of the memory-buffer type and contains the same input data word Pn as is undergoing comparison in the comparison circuit 13. The word Pn is simultaneously loaded into the comparison circuit 13 and into the register 14. The register 14 is of the three condition type (tristate) and has the capacity to isolate or disconnect its data output port 141 from the data bus BD2 when a third state control input 143 is actuated. When the comparison result signal RC is in the active logic state "1", the input data word Pn contained in the register 1 is supplied to the data outlet port 141 so as to be transmitted via the data bus BD2 to the data input port 120 of the memory 12. However, when the third state control input 143 is actuated, the data output port 141 of the register 14 is disconnected from the data bus BD2 by very high output impedances, and the word Pn is therefore not transmitted on the data bus BD2 to the memory 12. The initialization writing register 15 is of a type analogous to the comparison writing register 14. The register 15 contains an initialization data word In to be written in the memory 12. The word In is transmitted to the register 15 by the processing device 2 via a data bus BD4 and a data input port 151 of the register 15. A processing device 2 delivers an initialization data word In via a data output port 22. Similarly to the register 14, the register 15 comprises a reading control input 152 and a third state control input 153. When an initialization control signal TI having an active logic condition "1" is applied to the reading control input 152 of the register 15, the initialization data word In contained in the register 15 is supplied to the data output port 150 so as to be transmitted via the data bus BD2 to the data writing port 120 of the memory 12. However, when the third state control input 153 is actuated, the data output port 150 of the register 15 is disconnected from the data bus BD2 by very high output impedances and the word In is not transmitted via the data bus BD2 toward the memory 12. The initialization control signal CI is delivered by the processing device 2 via a corresponding output of a control port 23. The signal C1 is also applied to a writing control input 161 of the circuit for management of access and priority of memory 16.

The circuit for management of access and priority of memory 16 has for its function to manage the reading and writing access of the memory 12, and this whilst taking account of priorities. In this embodiment, the initialization writing register 13 has writing priority in memory 12 relative to the comparison writing register 14. In other words, when an initialization data word In must be written in memory 12, it has priority relative to an input data word Pn contained in the register 14 and which is also to be written at the same time in the memory 12. Moreover, still with reference to this embodiment, a request for reading memorized data words Qn in the memory 12, which request is effected by the processing device 2 by means of a reading control signal CL, has priority relative to a possible writing request of an input data word Pn in the memory 12. The reading control signal CL is delivered by the processing device 2 via a corresponding output of the control port 23.

The signal CL is applied to a reading control input 162 of the circuit for managing access and priority of memory 16.

The circuit for managing access and priority of memory 16 is a conventional combined logic circuit. Essentially from signals RC, CI and CL, the circuit 16 produces the memory writing control signal W, the memory reading control signal R, as well as third state control signals TEE and TEI supplied respectively to the comparison writing register 14 and initialization writing register 15.

The sequencing and control circuit 17 has for its principal function to control and sequence the operation of the multiple comparator assembly 1 so as to guarantee synchronization of operation, on the one hand between the assembly of the internal circuits of the multiple comparator 1 and on the other hand between the multiple comparator 1 and the means to which it is connected, namely the transmission line 101 and the processing device 2. The control and sequencing circuit 17 is connected by control and sequencing connections LC to the various circuits 10 to 16 of the multiple comparator 1, as well as to the processing device 2. The control and sequencing circuit 17 comprises essentially an internal time base (not shown) subjected to a multiplexing rhythm signal (not indicated) which is detected in the demultiplexing circuit 10 from the multiplex frames TM, as well as conventional logic circuits. The circuit 17 therefore receives different signals such as the multiplexing rhythm signal and management signals for the transfer of data (for example, data validation signals), and supplies to the different circuits 1 to 16 of and to the processing device 2 control and sequencing signals adapted to the different circuits and processing device and completely synchronous.

The different circuits described above and included in the multiple comparator according to the invention are all the integrable circuits available in the library of integrated circuits. The multiple comparator according to the invention is hence available in the form of an integrated circuit.

According to this embodiment, an input data word Pn is compared to the memorized data word Qn. In the case in which the word Pn is greater than the word Qn, in absolute values, then the word Pn is written in place of Qn in the memory 12, and for the following frame, a new input data word Pn' will be compared to a new memorized data word Q'n=Pn. In the contrary case in which the word Pn is equal to or less than the word Qn, in absolute values, the word Pn is not written in the memory 12 and, for the following frame, the new input data word Pn' is compared to the same memorized data word Q'n=Qn. This type of operation is well adapted to monitor the change of the waveforms of several signals and to detect possible saturations. This embodiment permits the monitoring in parallel of N different signals and it is possible to recover the signal envelopes with an adjustable resolution by the processing device 2 by means of the periodicity of the initializations effectuated in the memory 12 by the writing of the initialization data words In.

With reference to FIG. 2, an example of waveform OE of an input signal represented in analog form, is shown at the top of FIG. 2; an example of waveform OS of a corresponding output signal, such as is reconstitutable in its analog form from the data words Qn contained in the memory 12, is shown at the bottom of FIG. 2. In this example, the signal is monitored relative to a saturation level NS. The initializations are effected cyclically at a period TI. The value of the word In written in the memory 12 at each initialization instant corresponds to the level NS. The period TI defines a resolution for the reconstitution of the envelope of the waveform OS. In the case in which the period TI is very short, the envelope of the portion of the waveform OS of amplitude greater than the saturation NS is reconstructed with precision. In the contrary case in which the period TI is great, the envelope is more general and permits the appearance essentially of the increases of signal and the amplitude peaks.

Figure 2A:
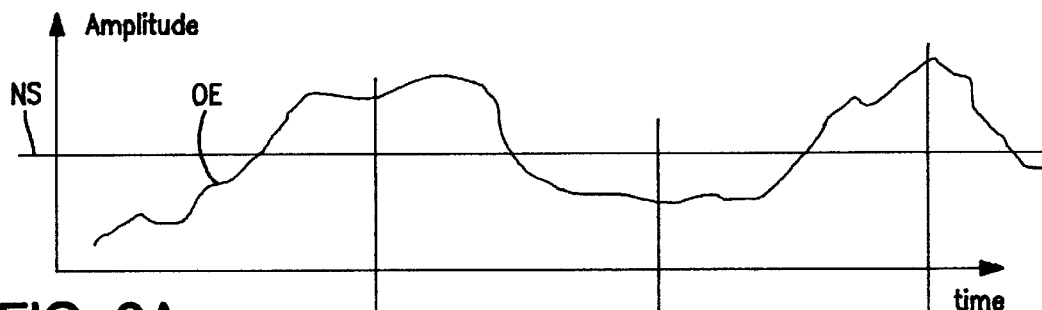
FIGS. 2A and 2B show an example of audio signal input supplied to a device according to the invention and a corresponding output signal reconstitutable from digital words delivered by the device.
Figure 2B:
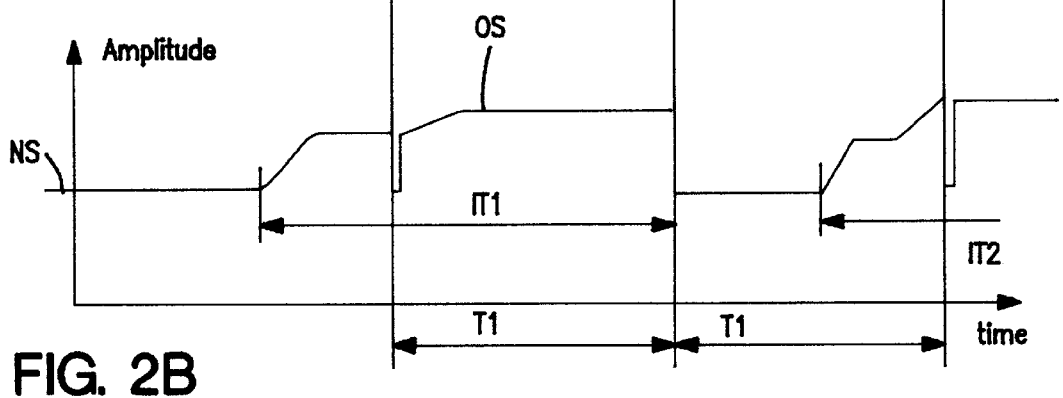

In FIGS. 2A and 2B, it will be seen that saturation occurs during the course of time intervals IT1 and IT2. It is therefore appropriate to reduce the signal gain so as to avoid this saturation in the processing chain.

Referring to the timing diagram of FIG. 3, the cycle of N comparisons effected by the comparison circuit 13 and corresponding to the processing of a frame TM will now be described.

Figure 3:
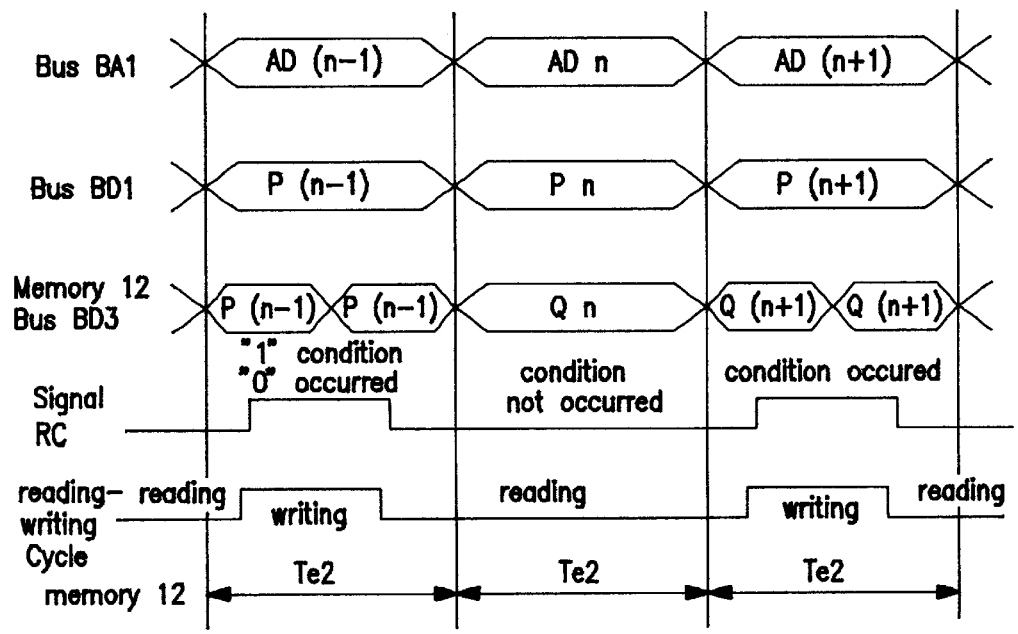
FIG. 3 shows a timing diagram of operation relative to the device according to FIG. 1.

The timing diagram of FIG. 3 shows an example of three successive comparisons between the input data words P(n−1), Pn and P(n+1) and the memorized data words Q(n−1), Qn and Q(n+1). These comparisons are a portion of the cycle of the N comparisons. For the first comparison, that between the words P(n−1) and Q(n−1), the word P(n−1) is considered to be greater than the word Q(n−1), in absolute values. For the second comparison, the one between the words Pn and Qn, the word Pn is considered to be equal to or less than the word Qn, in absolute values. For the third comparison, between the words P(n+1) and Q(n+1), the word P(n+1) is considered to be greater than the word Q(n+1), in absolute values.

During a comparison cycle, the address words AD1 and ADN are successively transmitted over the address bus BA1 (compare FIG. 3, line 5 from the bottom) by the address circuit 11. The address words AD1 and ADN are received by the demultiplexing circuit 10 and by the memory 12 and these latter, in turn, deliver successively the input data words P1 to PN and the memorized data words Q1 to QN, respectively (compare FIG. 3, lines 3 and 4). The words P1 to PN and Q1 to QN are successively loaded into the comparison circuit 13 so as to effect the N comparisons. The data words P1 to Pn are loaded parallelly into the comparison circuit 13 and into the comparison writing register 14.

When the comparison condition is effected, as is the case in this example for the comparisons (P(n−1), Q(n−1)) and (P(n+1), Q(n+1)), the signal for the comparison result RC takes the logic state "1" (compare FIG. 3, line 2). The signal RC with the state "1" controls the writing of the input data word P(n−1), P(n+1) into the corresponding cell of memory 12. The memorized data words Q(n−1) and Q(n+1) compared to the input data words P(n−1) and P(n+1) are thus replaced by the words P(n−1) and P(n+1) in the corresponding cells of the memory 12 (compare FIG. 3, line 3).

When the comparison condition is not effected, as is the case in this example for the comparison (Pn, Qn), the signal of the comparison result RC remains in the logic state "0" and the comparison writing register does not proceed to the transmission of the input data word Pn toward the data output port 141. No writing is therefore effected in the memory 12 and the word Qn remains thus memorized in the corresponding cell of the memory 12. The word Pn is then erased from the register 14 by the following input data word P(n+1).

The initialization writing in the memory 12 can be effected episodically or cyclically and this suitably for the processing device 2, the processing device carrying out these initializations while actuating the initialization control signal CI and while transferring the initialization data words I1 to IN and the corresponding address words AD1 to ADN respectively toward the data writing port 120 and the address port 122 of the memory 12. During this initialization writing, the circuit for access and priority of memory 16 then actuates the control signal of the third state TEE and thus controls a disconnection so as to award the data bus BD2 to the initialization writing register 15.

The transfer of the memorized data words Qn to the processing device 2 can take place in different ways.

As shown in FIG. 3, the data words Qn are available on the data bus BD3 (compare FIG. 3, line 3) each time the memory 12 is in the reading phase (compare FIG. 3, line 1) and, therefore, the bus BD3 being also connected to the processing device 2, the device 2 can therefore access the words Qn during time intervals corresponding to the reading phases.

Another way for the processing device 2 to access the memorized data words Qn consists in doing it via activation of the reading control signal CL. The possible writing of the input data words Pn is therefore suspended by the circuit for managing access and priority of the memory 16, and the processing circuit 2 addresses at a suitable time in the memory 12 the memorized data words Qn and this via the address bus BA2.

Figure 4:
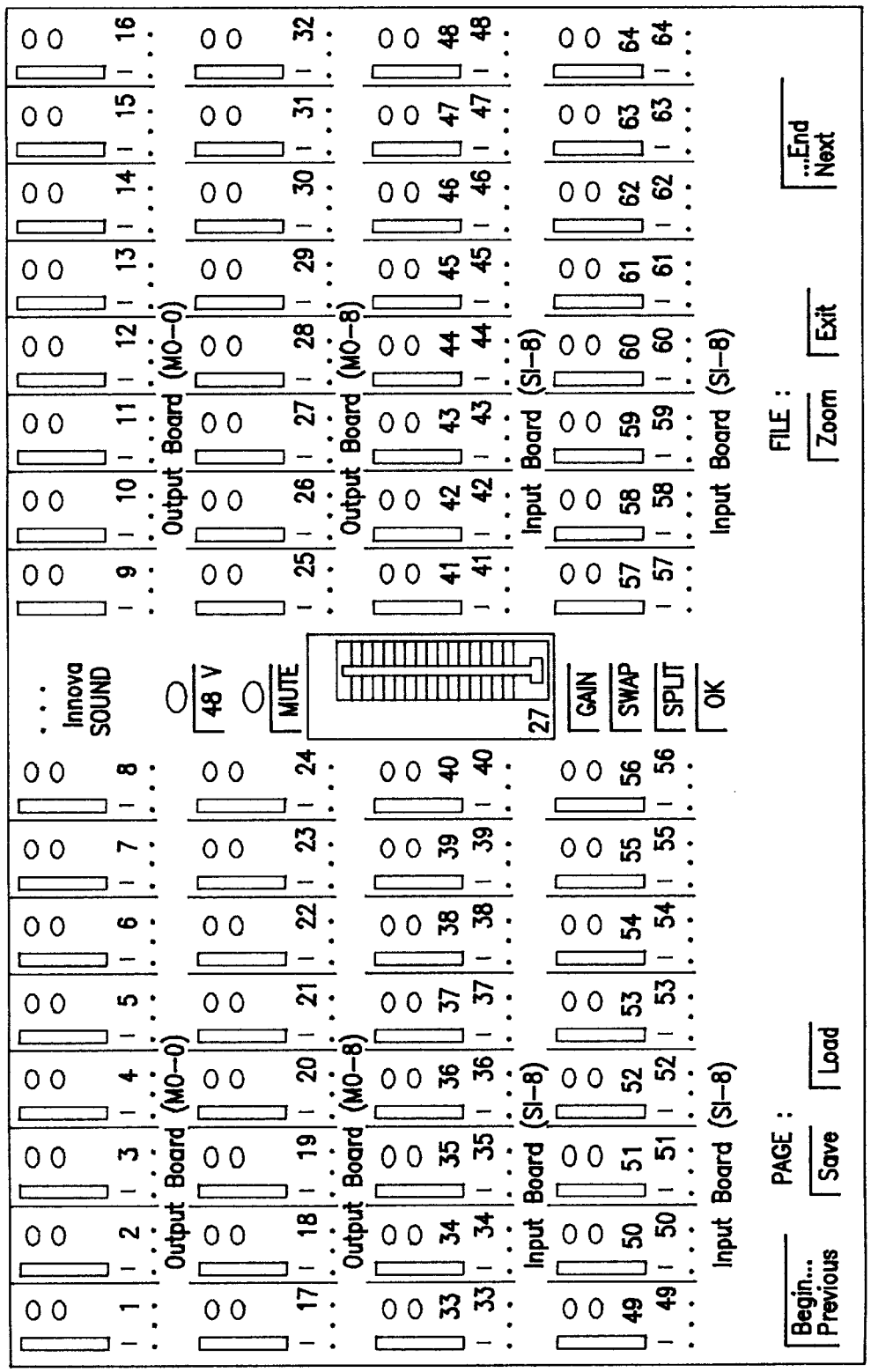
FIG. 4 shows a screen of a microcomputer comprising a plurality of control blocks in which are displayed the results supplied by a device according to the invention and this so as to permit monitoring and control in real time of a system for the transmission of high fidelity audio signals.

This latter mode of operation is well adapted for the case in which, for example, the processing circuit 2 must process the words Qn in a different order than that of the words Q1 to QN. Such is the case, for example, when the multiple comparator according to the invention is used in a professional bidirectional switching and transmission system with time multiplexing of the high fidelity digital audio and analog audio signals. In this case, the data words Qn are adapted to be displayed on the screen of a microprocessor which is divided, as shown in FIG. 4, into a plurality of control blocks M1 to M64. A data word Qn can give rise to a display in several control blocks as a function of the configuration of the system and the microprocessor must therefore be capable of addressing the words Qn in no matter what order. The multiple comparator according to the invention is particularly well adapted for use in such a system. The multiple comparator is then preferably located in so-called master receiver equipment generally located in a mixing control room. The processing device 2 is then constituted by the microprocessor, by the screen of which it is possible to monitor in real time different parameters, such as amplitudes or magnitudes, of a plurality of input signals and to take counteraction at the level of the input circuits included in the system, for example by decreasing the gain of the input circuits.

Obviously, the invention is not limited to the preferred embodiments described above. Many other embodiments are within reach of a person skilled in the art, given the information disclosed in the present application, and remain within the scope of the invention. Thus, for certain applications, the demultiplexing circuit 10 (FIG. 1) could be omitted because the modes of input data are then available on a bus and directly addressable.

In other cases, for example when the comparison condition corresponds to the satisfaction of an equation to be calculated, the comparison circuit can be comprised of a microcomputer of the microprocessor type.

Moreover, it is to be noted that the DRAM-type memories, that is, dynamic memories, are well adapted to constitute the memory 12. Thus, the memory 12 being read cyclically, the renewal of the DRAM memories is made in a "natural" manner which simplifies the circuitry for management associated with the memory 12. Nevertheless, other types of memories are also usable such as SRAM-type memories, for example, in the case of particularly severe access time constraints.

What is claimed is:

1. A dynamic multiple comparison device to monitor, in real time, changes in an incoming digital word stream, comprising:

memory means having N memory cells for storing respectively N digital words previously selected from said incoming digital word stream, N being a predetermined whole number, comparison means for effecting a series of N comparisons respectively between N incoming digital words and said N stored digital words of a same rank, selection means for selecting, following each of the N comparisons, a digital word among two compared digital words as a function of a predetermined comparison condition to obtain N selected digital words, first writing means for writing said N selected digital words respectively to said N memory cells of said memory means, addressing means for addressing said stored digital words in said memory means, control means for controlling a cyclical operation of the device to process said incoming digital word stream by successive series of N comparisons each, and second writing means for writing, episodically or cyclically, initialization digital words to said memory cells of said memory means.

2. The dynamic multiple comparison device according to claim 1, further comprising means for managing priorities of access to said memory means.

3. The dynamic multiple comparison means according to claim 1, wherein said incoming digital word stream includes successive frames, each frame having N multiplexed words which correspond to respectively N address words, and further comprising demultiplexing means for demultiplexing each of the frames.

4. The dynamic multiple comparison device according to claim 1, wherein said dynamic multiple comparison device includes an integrated circuit.

5. The dynamic multiple comparison device according to claim 1, wherein the comparison means includes a computer.

6. The dynamic multiple comparison device according to claim 1, wherein, during a comparison, said comparison means evaluates said comparison condition, and said selection means consecutively selects an incoming digital word, when an absolute value of the incoming digital word is greater than an absolute value of the corresponding stored digital word.

7. The dynamic multiple comparison device according to claim 6, further comprising means for displaying said stored digital words on a screen of a microcomputer in a plurality of control blocks provided on said screen so as to permit a user to monitor, in real time, changes of different parameters of a plurality of signals transmitted in a professional system for switching and bidirectional transmission with time-multiplexing of high fidelity digital audio and analog audio signals and to control, in real time, changes and adaptations of a configuration of the system.

8. A dynamic multiple comparison device to monitor, in real time, changes in an incoming digital word stream, comprising:

memory means having N memory cells for storing respectively N digital words previously selected from said incoming digital word stream, N being a predetermined whole number, comparison means for effecting a series of N comparisons respectively between N incoming digital words and said N stored digital words of a same rank, selection means for selecting, following each of the N comparisons, a digital word among two compared digital words as a function of a predetermined comparison condition to obtain N selected digital words, first writing means for writing said N selected digital words respectively to said N memory cells of said memory means, addressing means for addressing said stored digital words in said memory means, control means for controlling a cyclical operation of the device to process said incoming digital word stream by successive series of N comparisons each, and means for managing priorities of access to said memory means.

9. The dynamic multiple comparison means according to claim 8, wherein said incoming digital word stream includes successive frames each frame having N multiplexed words which correspond to respectively N address words, and further comprising demultiplexing means for demultiplexing each of the frames.

10. The dynamic multiple comparison device according to claim 8, wherein said dynamic multiple comparison device includes an integrated circuit.

11. The dynamic multiple comparison device according to claim 8, wherein the comparison means includes a computer.

12. The dynamic multiple comparison device according to claim 8, wherein, during a comparison, said comparison means evaluates said comparison condition, and said selection means consecutively selects an incoming digital word, when an absolute value of the incoming digital word is greater than an absolute value of the corresponding stored digital word.

13. The dynamic multiple comparison device according to claim 12, further comprising means for displaying said stored digital words on a screen of a microcomputer in a plurality control blocks provided on said screen so as to permit a user to monitor, in real time, changes of different parameters of a plurality of signals transmitted in a professional system for switching and bidirectional transmission with time-multiplexing of high fidelity digital audio and analog audio signals and to control, in real time, changes and adaptations of a configuration of the system.

\* \* \* \* \*